United States Patent
Assaad et al.

(10) Patent No.: US 6,394,160 B1
(45) Date of Patent: May 28, 2002

(54) TIRE WITH SEGMENTED BELT

(75) Inventors: Mahmoud Cherif Assaad, Uniontown; Michael Gregory Zelin, Canal Fulton, both of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/725,651

(22) Filed: Nov. 29, 2000

(51) Int. Cl.7 ............................ B60C 9/18; B60C 9/20
(52) U.S. Cl. ........................................ 152/536; 152/526
(58) Field of Search .................. 152/526, 531, 152/536

(56) References Cited

U.S. PATENT DOCUMENTS

| | | | | |
|---|---|---|---|---|
| 1,842,353 A | * | 1/1932 | Lorentz | .................. 152/526 X |
| 2,895,525 A | | 7/1959 | Lugli | |
| 2,958,359 A | | 11/1960 | Boussu et al. | |
| 3,224,482 A | * | 12/1965 | Barassi et al. | .......... 152/526 X |
| 3,658,999 A | | 4/1972 | Tangorra et al. | |
| 3,719,218 A | | 3/1973 | Leybourne, III | |
| 3,757,843 A | | 9/1973 | Carr | |
| 3,757,844 A | | 9/1973 | Verdier | |
| 4,140,166 A | | 2/1979 | Koyama et al. | |
| 4,146,415 A | * | 3/1979 | Caretta et al. | .......... 152/531 X |
| 5,111,863 A | * | 5/1992 | Nakasaki | .................. 152/526 |
| 5,225,012 A | | 7/1993 | Narahara et al. | |
| 5,228,933 A | * | 7/1993 | Kawabata et al. | ...... 152/526 X |
| 5,396,941 A | | 3/1995 | Iuchi | |
| 5,404,924 A | * | 4/1995 | Yuze | ....................... 152/526 X |
| 5,593,521 A | * | 1/1997 | Iseki | ....................... 152/526 X |
| 5,593,523 A | | 1/1997 | Suzuki et al. | |
| 5,746,853 A | * | 5/1998 | Burlacot | ................. 152/526 X |

FOREIGN PATENT DOCUMENTS

| | | |
|---|---|---|
| EP | 0422881 | 4/1991 |
| GB | 1587711 | 4/1981 |

\* cited by examiner

*Primary Examiner*—Adrienne C. Johnstone
(74) *Attorney, Agent, or Firm*—Nancy T. Krawczyk

(57) ABSTRACT

The present invention is directed towards a pneumatic radial tire. The tire is comprised of a reinforcing belt structure wherein the belt plies are divided into at least three segments. The reinforcing cords in each segment of a ply are oriented in the same inclination direction. By maintaining the same cord inclination in the segments, dividing the belt ply into segments creates hinge points for the belt ply, reducing the stiffness of the ply across the width of the tread from the centerline of the tire to the tread edges. If the belt structure has more than one reinforcing ply, the segments of the adjacent plies are staggered by a distance at greater than the radial height between the radially inner side of the adjacent belt plies.

11 Claims, 5 Drawing Sheets

TIRE WITH SEGMENTED BELT

TECHNICAL FIELD

The disclosed invention is about a pneumatic radial tire. More particularly, the present invention is directed towards a tire comprising a belt package wherein the belt ply edge separation is reduced by selective segmenting of the belt plies.

BACKGROUND OF THE INVENTION

Conventional pneumatic belted radial tires include at least two annular layers or plies of parallel cords, woven or unwoven, underlying the tread. The belt plies are arranged so that the left and right cords are inclined at angles of 15° to 30 with respect to the equatorial plane of the tire.

During operation of the tire, the belt ply edge separation can occur. The problem is generally attributed to the interlaminar shear strain or the strain energy density at the edge of the belt plies. Edge effect is best explained by the simple fact that the belt is very stiff while the adjacent rubber has a much lower stiffness. A smoother transition from the belt to the adjacent rubber will reduce the amount of interlaminar shear strain and the strain energy density.

To reduce the strain at the edges of the belt, it has been conventional practice to gradually reduce the belt ply widths. In such a tire design, the greatest width belt ply is adjacent the tire carcass layers and the narrowest width belt ply is closet to the overlying tread. Other known means of attempting to reduce the belt edge separation include employing overlay plies at the belt edges, cushion rubbers at the belt edges, or varying the modulus of the coating rubber in the differing belt layers.

Exemplary patents of other attempts to reduce belt edge separation include U.S. Pat. Nos. 4,140,166, 3,791,218, 3,757,843, and 5593523.

SUMMARY OF THE INVENTION

The present invention is directed towards a pneumatic radial tire. The tire is comprised of a reinforcing belt structure wherein the belt plies are divided into at least three segments. The reinforcing cords in each segment of a ply are oriented in the same inclination direction. By maintaining the same cord inclination in the segments, dividing the belt ply into segments creates hinge points for the belt ply, reducing the stiffness of the ply across the width of the tread from the centerline of the tire to the tread edges.

In one aspect of the present invention, if the belt structure has more than one reinforcing ply, the segments of the adjacent plies are staggered by a distance at greater than the radial height between the radially inner side of the adjacent belt plies.

In another aspect of the invention, the adjacent segments of each ply are separated by a distance u that is not greater than the radial thickness of the ply if the belt structure is a single ply, or a distance u that is not greater than the radial height h between the radially inner surface of the adjacent belt plies if the belt structure is comprised of more than one ply.

In another aspect of the invention, the central segments of the divided belt plies have an axial width of 20 to 80 percent of the tread width.

In another aspect of the invention, the divided plies of the belt structure has a central segment 34a, 36a, and two edge segments 34b, 36b, and the reinforcing cords of the central segment have a greater modulus value than the cords of the edge segments 34b, 36b.

BRIEF DESCRIPTION OF DRAWINGS

The invention will be described by way of example and with reference to the accompanying drawings in which.

DETAILED DESCRIPTION OF THE INVENTION

Figure 1:
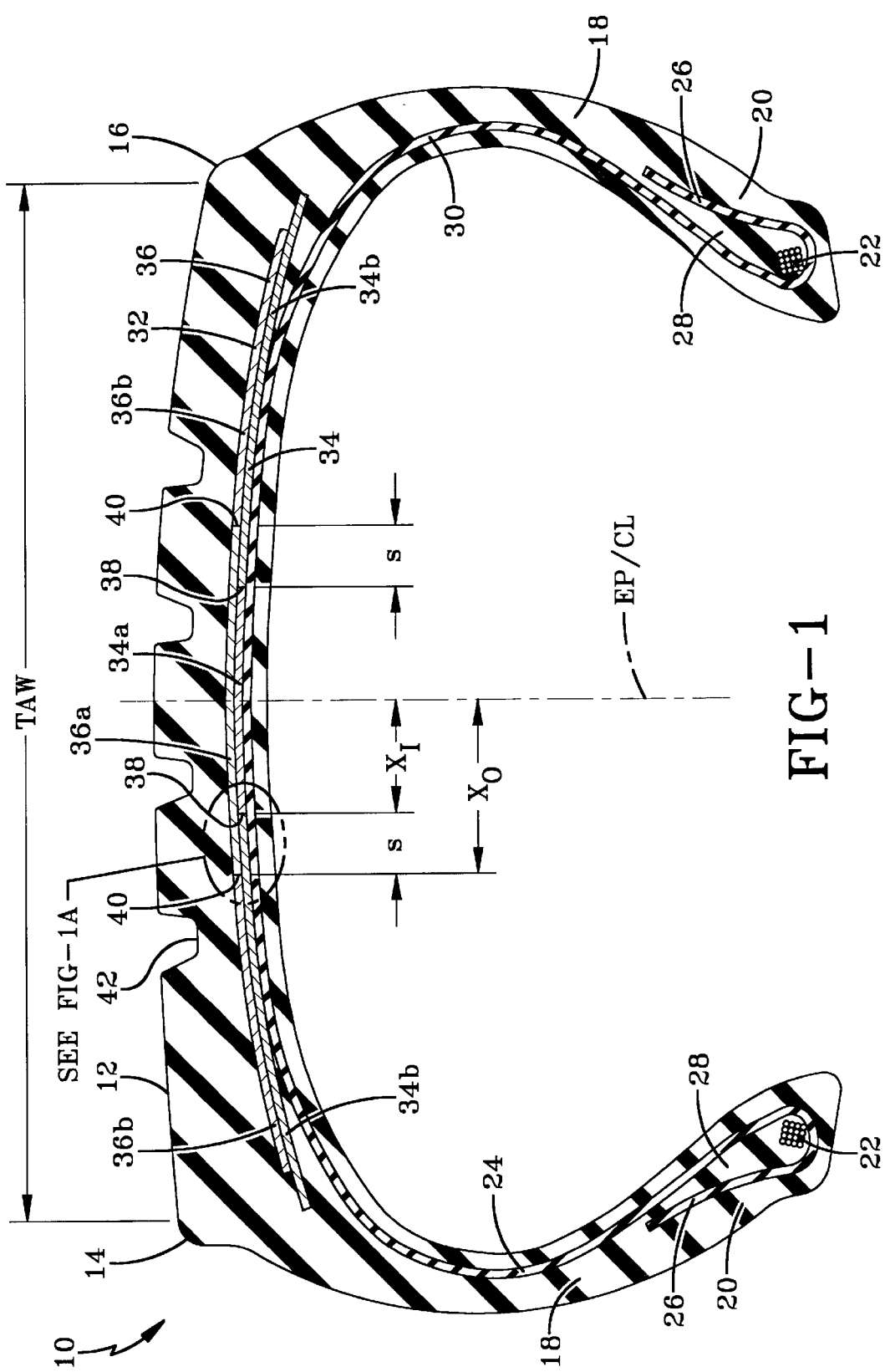
FIG. 1 is a cross-sectional view of a tire built in accordance with the present invention.

For purposes of this application the various embodiments illustrated in the drawing figures each use the same reference numerals for similar components. The tire structures have the same components with variations in location or quantity thereby giving rise to the alternative constructions in which the inventive concept can be practiced.

Tires 10 as illustrated in FIGS. 1 to 4 are radial passenger or light truck tires, and may be low aspect or high aspect ratio tires, depending upon the final tire size selected. The illustration of the aspect ratio of the tire is not selected as limiting to the present invention. The tire 10 has a ground-engaging tread 12 that terminates in the shoulder segments at the lateral edges 14,16 of the tread 12 respectively. A pair of sidewall segments 18 extend from tread lateral edges 14,16 respectively and terminate in a pair of bead regions 20 each having an annular inextensible bead core 22 respectively. The tire 10 is further provided with a carcass 24 which extends from bead region 20 through one sidewall portion 18, tread portion 12, the opposite sidewall portion 18 to bead region 20. The turnup ends 26 of the carcass 24 are wrapped about bead cores 22. The turnup ends 26 may end at about the radial location of the maximum section width of the tire 10 or at any location desired by the tire engineer. Between the turnup ends 26 and the main structure of the carcass 24, and above the bead cores 22 is a bead apex 28. The tire 10 may include a conventional innerliner forming the inner peripheral surface of the tire 10 if the tire is to be of the tubeless type. The tire 10 may also be provided with conventional bead reinforcement layers and toe guards in the bead region 20 of the tire (not illustrated).

As shown in FIG. 1, the tire 10 can employ a single ply 30 for the carcass 24. Each carcass ply 30 of the tire 10 is formed of reinforcing cords which are substantially parallel to each other and make an angle of about 65° to 90° with the equatorial plane (EP) of the tire. The cords may be made of any material normally used for cord reinforcement of rubber articles, for example, and not by way of limitation, rayon, nylon and polyester, polyamide, aromatic polyamide, or steel. Preferably, the cords are made of material having a high adhesion property with rubber and high heat resistance.

Placed circumferentially about the radially outer surface of the carcass 24 and beneath the tread 12 is a tread reinforcing belt structure 32. The belt 32 provides lateral stiffness across the belt width to minimize lifting of the tread 12 from the road surface during operation of the tire 10. The belt structure 32 may be a single reinforcing ply or it may be comprised of multiple plies and may include cushion layers between the plies. In order to better illustrate certain further aspects of the invention, the illustrated belt structure 32 is formed from two cut belt plies 34, 36. Each ply 34, 36 is comprised of reinforcing cords of a suitable material, such as aromatic polyamide, steel, glass fiber, carbon-fiber or nylon. Within each belt ply, all the cords are substantially parallel to each other, but they are inclined at an opposed angle, with respect to the equatorial plane of the tire, to the cords in the adjacent belt ply. The cords of the radially innermost belt ply 34 make, for example, an angle of 15° to 35° with respect to the equatorial plane (EP) of the tire, whereas the cords of the radially outermost belt ply 36 extend in the diagonally opposite direction to the cords of the radially innermost belt ply, i.e. they make an angle of −15° to −35° with respect to the equatorial plane (EP) of the tire.

The inventive modification to the belt 32 is to segment the plies 34, 36 to form at least three belt segments from each belt ply 34,36, forming a central belt portion 34a, 36a and two belt edge segments 34b, 36b. The radially inner most belt ply 34 is divided into a central portion 34a and two edge segments 34b. The radially outer most belt ply 36 is divided into a central portion 36a and two edge segments 36b. As discussed above, the cords in each entire ply are inclined in a single direction. When each ply 34,36 is segmented, the cords in each segment 34a, 34b, 36a, 36b of each ply 34, 36 are also inclined in the same direction. By maintaining the same cord inclination, the step of subdividing each belt ply 34, 36 into at least three segments decreases the stiffness of the belt plies 34, 36 across the width of the tire 10 from the tire centerline CL to the tread edges 14, 16, effectively creating hinge points 38, 40 in the respective belt plies 34, 36. Reducing the stiffness of the belt plies 34, 36 across the width of the tread in this manner reduces the strain at the edge of the belts 34, 36 and reduces the belt edge separation.

Figure 1A:
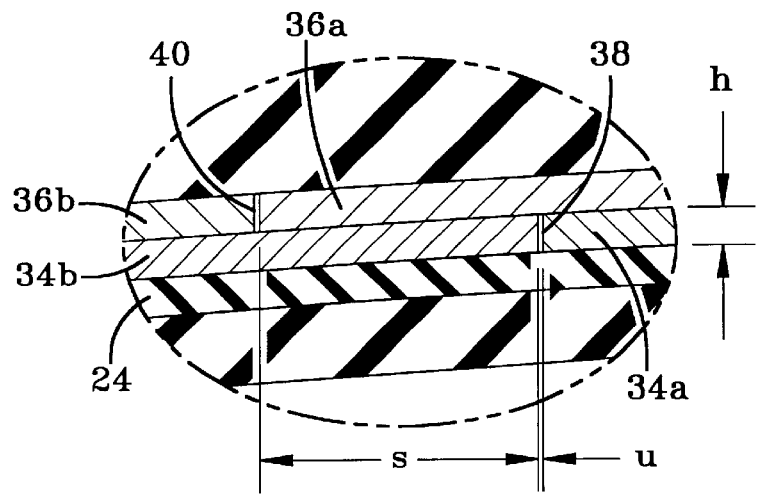
FIG. 1A is a close up cross-sectional view of the edges and overlap of the belt segments of the tire of FIG. 1.
Figure 2A:
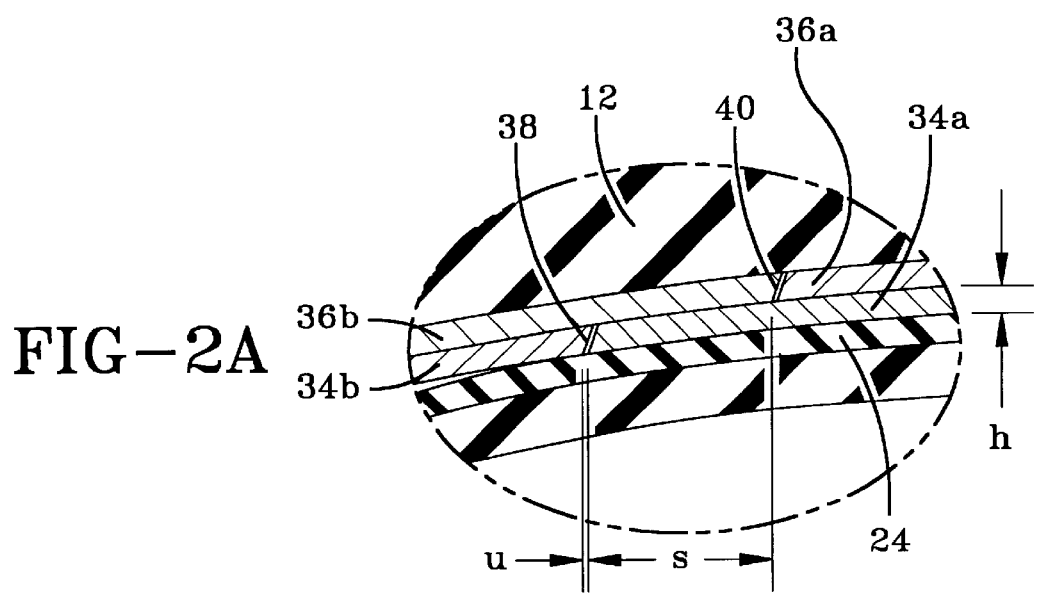
FIG. 2A is a close up cross-sectional view of the edges and overlap of the belt segments of the tire of FIG. 2.

In constructing the belt structure 32, the central segments 34a, 36a and the edge segments 34b, 36b are laid next to each edge to edge. If the edges of the belt segments 34a, 36a, 34b, 36b are cut perpendicular to the belt ply surface, as seen in FIG. 1A, than the belt segments 34a, 36a, 34b, 36b are laid adjacent to one another with no overlap between the segments. If the edges of the belt segments 34a, 36a, 34b, 36b are skived at an angle with respect to the belt ply surface, as seen in FIG. 2A, than the complementary angles of the adjacent segments are matched up to form a belt ply 34, 36 that has no visible overlap or dual thickness of the belt at any portion of the belt.

The hinge point 38, 40 of each ply 34, 36 is also selected so that it is not located directly underneath any continuously extending circumferential groove 42 of the tire tread 12. By not placing the hinge points 38,40 under a continuously extending circumferential groove 42, the stiffness of the belt structure 32 directly under the groove 42 is not reduced or compromised.

Each hinge point 38, 40 of each ply 34,36 is the same distance from the tire centerline CL so that the hinge points 38, 40 are symmetrical with respect to the centerline CL. If the tire 10 is engineered to be mounted on a specific side of a vehicle, than to optimize the tire's performance, the hinge points 38, 40 of each ply 34,36 may be asymmetrical with respect to the tire centerline CL. The hinge point 38,40 of each point is located a distance $X_I$, $X_O$ of 10 to 40% of the tread width TAW from the tire centerline CL; thus the central segments 34a, 36a have an axial width of 20 to 80% of the tread width TAW. The hinge points 38 of the radially inner ply 34 are at a distance $X_I$ of about 10% of the tread width TAW from the centerline CL. The hinge points 40 of ply 36 are at a distance $X_O$ of about $_{15}$% of the tread width TAW from the centerline CL.

FIG. 1A more clearly illustrates the region of the belt structure 32 where the belt plies 34, 36 are segmented, creating the hinge points 38, 40. The axial distance s between the hinge points 38,40 of the inner ply 34 and the outer ply 36 is chosen to be greater than the radial distance h between the radially inner surface of adjacent plies 34,36. For example, for the illustrated tire wherein the plies 34, 36 are adjacent to each other, separated by only the coating rubber of the plies 34, 36, the distance s must be greater than the thickness of the coating rubber of the two plies 34,36 and the thickness of the inner ply 34.

As noted previously, the edges of the belt segments 34a, 34b, 36a, 36b are laid edge to edge next to each other. The distance u between the edges of the belt segments 34a, 34b, 36a, 36b has a maximum width equal to the distance h between the radially inner surfaces of adjacent plies 34, 36, and a minimum width of zero. As the distance u increases from zero, the reduction in the belt stiffness across the width of the tire 10 is further reduced. However, if the distance u is greater than h, the conventional hooping effect of the belt ply 34, 36 is reduced. If the belt structure 32 is a single ply 34, than the distance u is not greater than the thickness of the belt ply 34.

Figure 2:
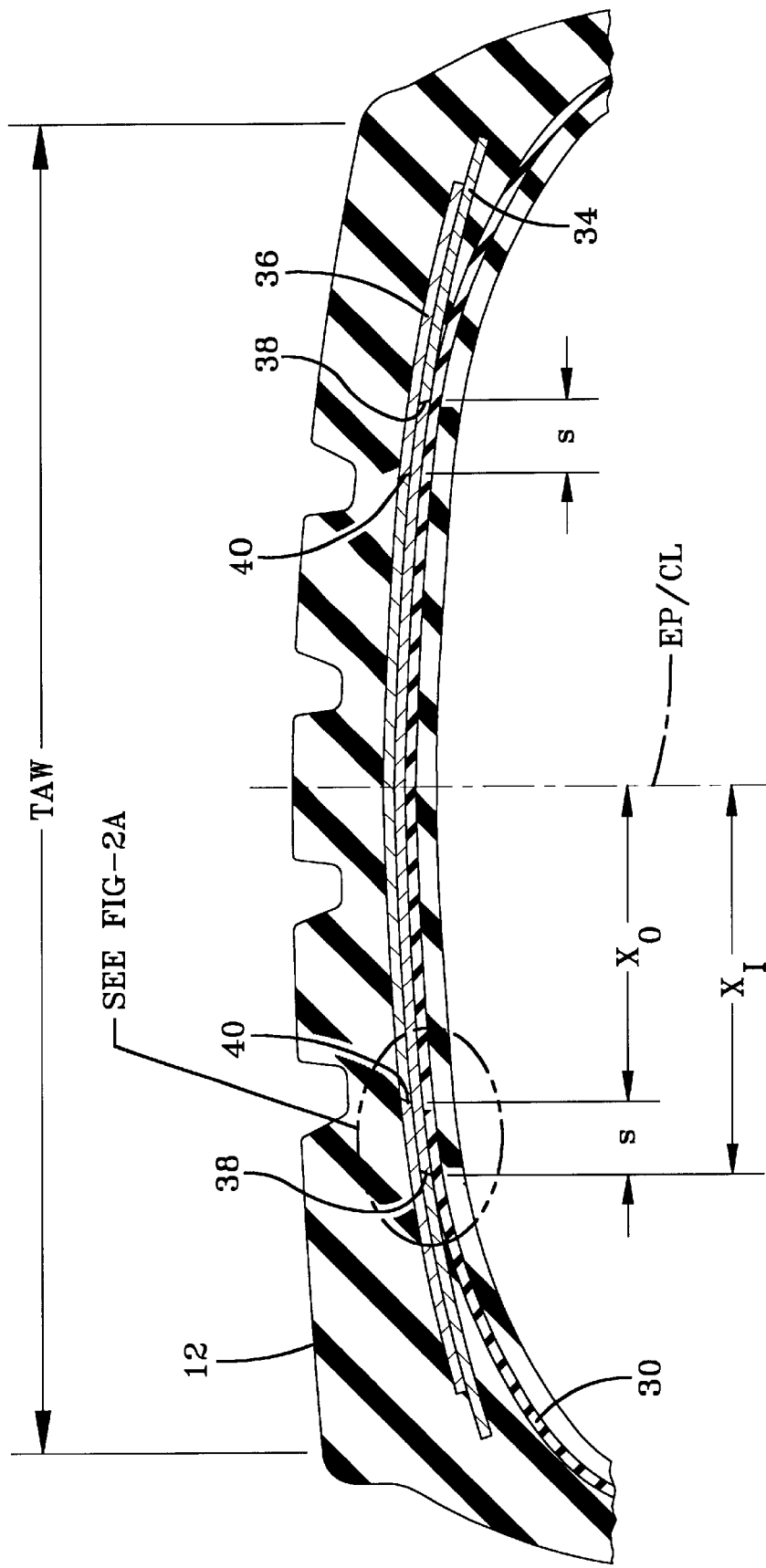
FIG. 2 is a cross-sectional view of another embodiment of the inventive tire.

FIGS. 2 and 2A illustrate a tire belt structure 32 in accordance with the invention. In this embodiment, the hinge points 40 of the radially outer belt ply 36 are located closer to the tire centerline CL than the hinge points 38 of the radially inner ply 38. The hinge points 40 of the outer ply 36 are approximately 25% of the tread width TAW from the centerline CL; the hinge points 38 of the inner ply 34 are approximately 30% of the tread width TAW from the centerline CL.

The edges of the belt segments 34a, 34b, 36a, 36b are illustrated as being cut at an angle relative to the belt ply surface. The distance s is then measured from the same point of the angled splice in one belt ply 34 to the same point of the angled splice in the adjacent ply 36.

Figure 3A:
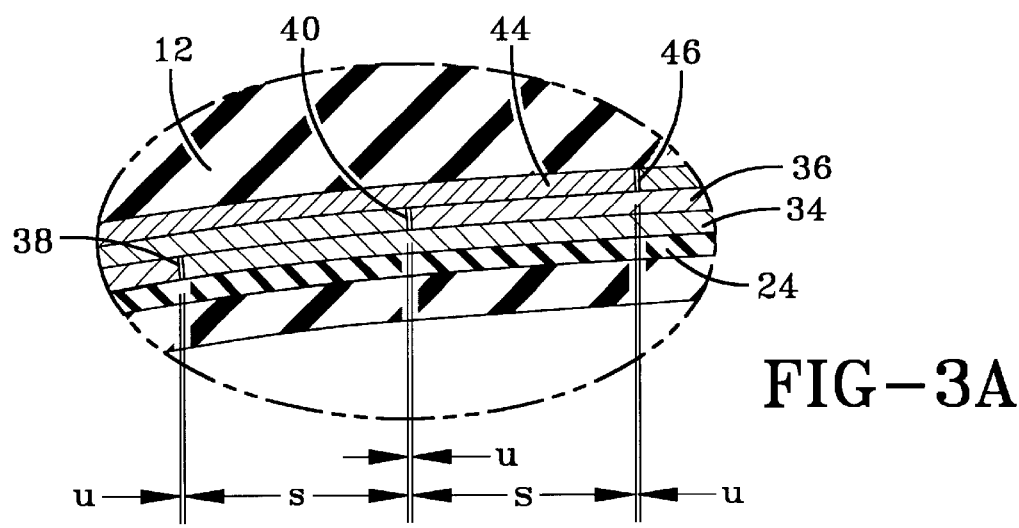
FIG. 3A is a close up cross-sectional view of the edges and overlap of the belt segments of the tire of FIG. 3.
Figure 3:
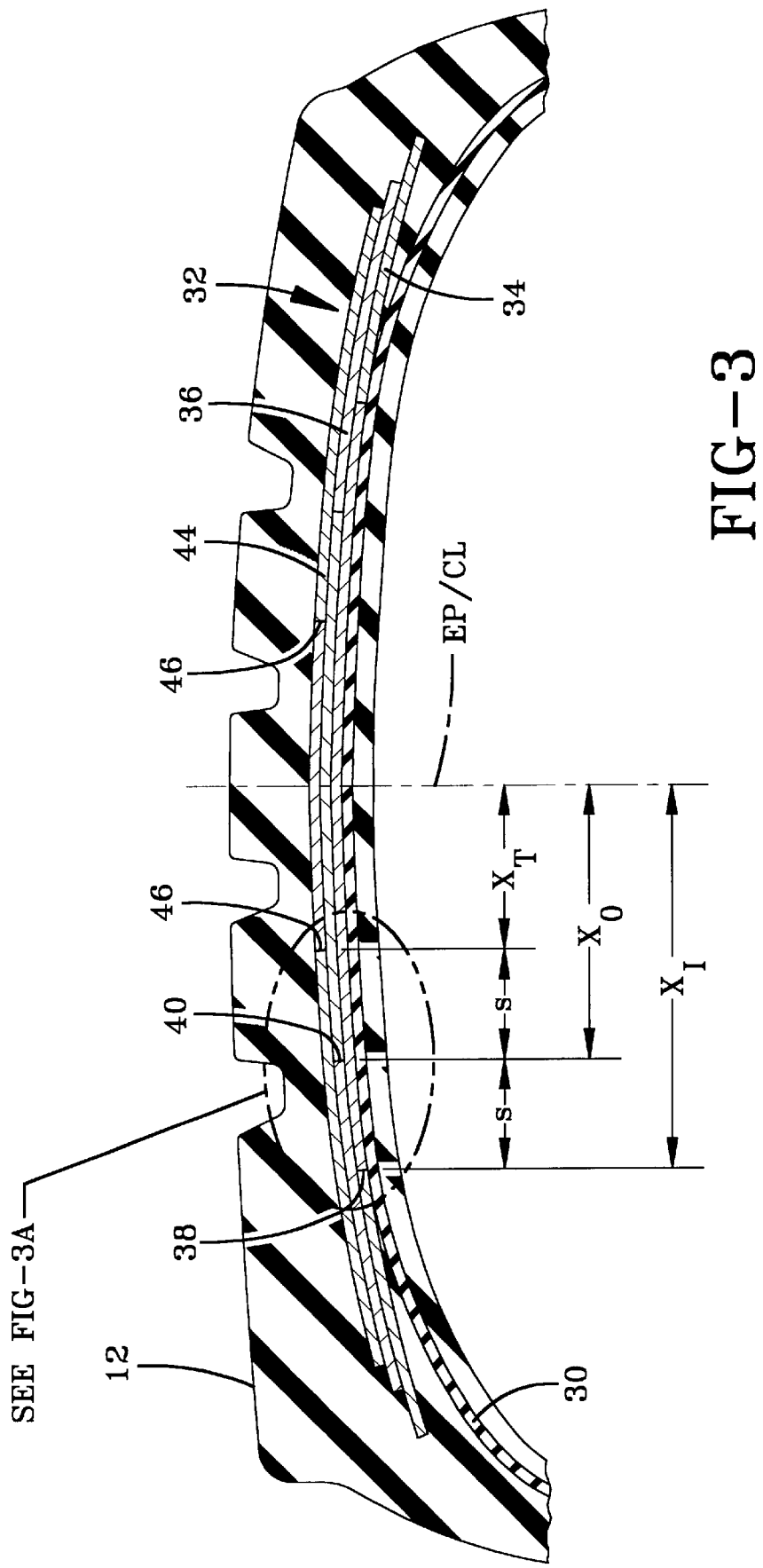
FIG. 3 is a cross-sectional view of another embodiment of the inventive tire.

FIGS. 3 and 3A illustrates a tire belt 32 wherein the belt 32 is comprised of three plies, 34, 36, 44. The third ply 44 is also segmented at hinge points 46. The hinge points 46 of the third ply 44 are located at a distance $X_T$ of 10% to 40% of the tread width TAW from the tire centerline CL. The hinge points 46 of the third ply 44 may be located a distance $X_T$ closer or farther away from the centerline CL than the distance $X_O$, so long as the distance S between the hinge points of the plies is greater than the radial distance between the plies.

Figure 4:
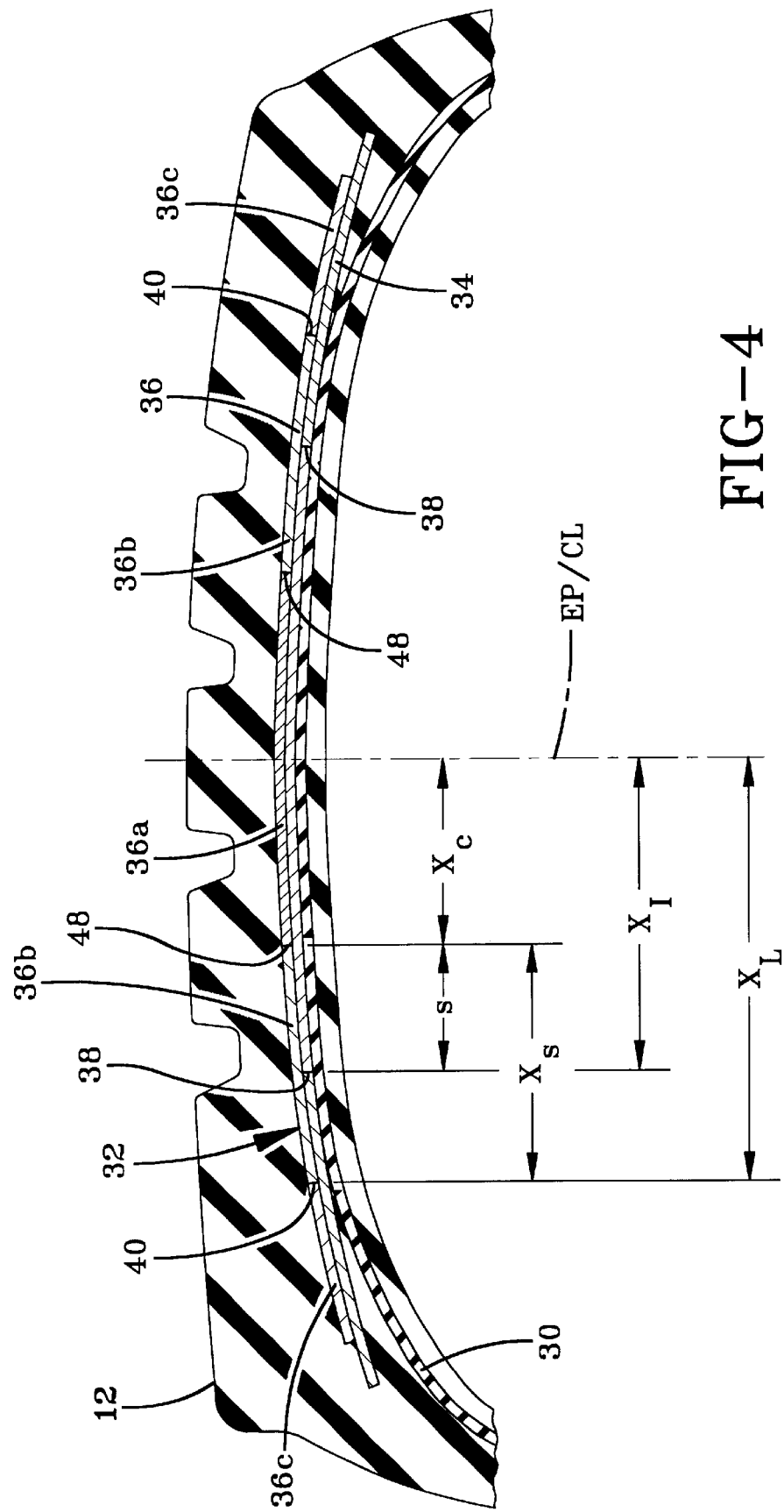
FIG. 4 is a cross-sectional view of another embodiment of the inventive tire.

FIG. 4 illustrates a tire belt 32 wherein at least one of the plies 36 is segmented into more than three segments. The radially outer ply 36 is divided into five segments, a central portion 36a, two intermediate segments 36b, and two outer segments 36c. The two axially innermost hinge points 48 are spaced from the tire centerline CL by a distance $X_C$ by a distance of 10% to 35% of the tread width TAW. If a single ply is segmented into more than three segments, as illustrated, the hinge points 40, 48 should be axially separated by a distance XS of at least 5% of the tread width TAW. The innermost hinge point and the hinge point in the remaining belt plies 34 should be separated by a distance S greater than the radial distance between the plies 34, 36. Again, the hinge points 38, 40, 48 are judiciously placed to avoid being directly under any continuous circumferential groove 42.

A further decrease in the stiffness of the belt from the tread centerline CL to the tread edges 14, 16 can be achieved by forming the belt segments from different materials of construction, but with the same inclination angles. For example, the central most segments 34a, 36a maybe formed from a cord that has a greater modulus value than the cords in the outermost belt segments 34b, 36b. Alternatively, the cord spacing, rubber gauges, and rubber compositions for the different segments may be modified in order to fine tune the decrease in stiffness of the belt plies.

To determine the improvement in belt edge separation for the inventive tire, twenty-four tires were built in accordance with the present invention and tested against the same number of conventional tires. Twenty four tires were constructed with segmented belt plies. The tires had two belt plies, each divided into three segments. The radially outer ply had a central segment with a width of 68 mm, and two edge segments with widths of 60 mm. The radially inner ply had a central segment with a width of 80 mm and two edge segments with widths of 60 mm.

The remaining tire aspects of the inventive test tires and the conventional tires were identical. The tires were seated on wheel rims, inflated to the same inflation pressures, and then vertically loaded. The tires were also subjected to conditions simulating handling to determine driving response to the different tire constructions. The results for the tires are set forth in Table 1. The data for all the inventive tires was averaged together to obtain the following data, and the same was done for all the conventional comparison tires.

TABLE 1

|  | Inventive Tires | Conventional Tires |
| --- | --- | --- |
| Fatigue Capacity |  |  |
| High Speed/Maximum Load | 156 | 122 |
| Low Speed/Maximum Load | 147 | 96 |
| Belt Edge Separation | No | Yes |
| Shape Factor | 1.26 | 1.10 |
| Length/Width of Footprint |  |  |
| Ride & Handling | better ride comfort | quicker response |

The tires constructed with the segmented belt plies did not experience belt edge separation, while the conventional tires experienced belt edge separation. Additionally, the inventive tires had a greater fatigue capacity than the conventional tires at both high speed and low speed.

The footprint pressure distribution of both the inventive and conventional tires was determined. The conventional tires exhibited localized pressure in all of the tread ribs. The pressure distribution in the inventive tires was more equally distributed across the ribs and the tread.

To manufacture the tire 10 of the present invention, as each belt ply 34, 36 is applied to the carcass 24 during building of the green tire, the belt ply 34, 36 may be longitudinally cut to divide the continuous belt ply 34, 36 into the desired number of segments 34a, 34b, 36a, 36b. The belt ply segments 34a, 34b, 36a, 36b are then laid adjacent to one another as the belt structure 32 is built up to the desired number of plies. Such a construction method and an exemplary machine to cut the belt plies is disclosed in the commonly assigned patent application, Ser. No. 09/725,692, filed Nov. 29, 2000.

Alternatively, the belt ply 34, 36 may be previously divided into the desired segments 34a, 34b, 36a, 36b and applied to the green tire in the required lay-up. Such a construction is necessary if the cord materials, cord spacing, rubber gauges, or rubber compositions of the different segments 34a, 34b, 36a, 36b are varied to achieve different ply stiffness. In such a build scenario, the builder must ensure that the cord inclinations of the segments 34a, 34b, 36a, 36b of each ply 34, 36 are identical.

What is claimed is:

1. A pneumatic radial tire 10 comprising reinforcing belt structure 32, the belt structure 32 being formed of at least two reinforcing plies 34, 36, the at least two plies 34, 36 being comprised of a plurality of reinforcing cords, each of the at least two plies 34, 36 being divided into at least three segments 34a, 34b, 36a, 36b, and the reinforcing cords in each ply segment 34a, 34b, 36a, 36b in each ply 34, 36 are oriented in the same inclination direction.

2. A pneumatic radial tire in accordance with claim 1 wherein the segments 34a, 34b, 36a, 36b are axially staggered.

3. A pneumatic radial tire in accordance with claim 1 wherein the segments 34a, 34b, 36a, 36b in adjacent plies 34, 36 are axially staggered by a distance s greater than the radial height h between the radially inner surface of the adjacent belt plies 34, 36.

4. A pneumatic radial tire in accordance with claim 1 wherein the adjacent segments 34a, 34b, 36a, 36b are separated by a distance u that is not greater than the radial thickness of each ply 34, 36.

5. A pneumatic radial tire in accordance with claim 1 wherein the adjacent segments 34a, 34b, 36a, 36b in each ply 34, 36 are separated by a distance u that is not greater than the radial height h between the radially inner surface of the adjacent belt plies 34, 36.

6. A pneumatic radial tire in accordance with claim 1 wherein one of the at least two plies has a central segment 34a, the central segment 34a having an axial width of 20 to 80% of the tread width TAW.

7. A pneumatic radial tire in accordance with claim 1 wherein each of the at least two plies has a central segment 34a, 36a, the central segment having an axial width of 20 to 80% of the tread width TAW.

8. A pneumatic radial tire in accordance with claim 1 wherein each ply has a central segment 34a, 36a, and two edge segments 34b, 36b, and the reinforcing cords of the central segment have a greater modulus value than the cords of the edge segments 34b, 36b.

9. A pneumatic radial tire in accordance with claim 1 wherein the tire has a tread centerline CL and a pair of opposing tread edges 14, 16 and the reinforcing cords in the segments 34a, 36a, 34b, 36b have different cord spacings such that the stiffness of the belt decreases from the tread centerline CL to the tread edges 14, 16.

10. A pneumatic radial tire in accordance with claim 1 wherein the tire has a tread centerline CL and a pair of opposing tread edges 14, 16 and the segments 34a, 36a, 34b, 36b have different rubber gauges such that the stiffness of the belt decreases from the tread centerline CL to the tread edges 14, 16.

11. A pneumatic radial tire in accordance with claim 1 wherein the tire has a tread centerline CL and a pair of opposing tread edges 14, 16 and the segments 34a, 36a, 34b, 36b are constructed with different elastomeric compositions such that the stiffness of the belt decreases from the tread centerline CL to the tread edges 14, 16.

* * * * *